United States Patent [19]
D'Alterio et al.

[11] Patent Number: 6,026,737
[45] Date of Patent: Feb. 22, 2000

[54] METHOD AND APPARATUS FOR MOLDING FOOD PARTICLES

[75] Inventors: Joseph C. D'Alterio, Glen Cove; Paul W. Garbo, Freeport, both of N.Y.

[73] Assignee: SBJR Restaurants Inc., River Vale, N.J.

[21] Appl. No.: 09/176,367

[22] Filed: Oct. 21, 1998

[51] Int. Cl.[7] .......................... A21C 11/00; B29C 43/02
[52] U.S. Cl. ............................ 99/349; 99/353; 99/380; 99/432; 99/439; 425/394; 426/513; 426/523
[58] Field of Search .............................. 99/426, 349, 380, 99/381, 439, 428, 353, 372, 432; 100/318, 320, 325; 425/394, 398; 426/513, 523

[56] References Cited

U.S. PATENT DOCUMENTS

| | | |
|---|---|---|
| 3,940,217 | 2/1976 | McCarthy et al. .................. 426/513 X |
| 5,074,778 | 12/1991 | Betts, Jr. et al. ...................... 99/432 X |
| 5,154,115 | 10/1992 | Kian ....................................... 99/372 X |
| 5,376,395 | 12/1994 | Pels ....................................... 99/349 X |

FOREIGN PATENT DOCUMENTS

| | | | |
|---|---|---|---|
| 889898 | 1/1944 | France | ...................................... 99/372 |

*Primary Examiner*—Reginald L. Alexander
*Attorney, Agent, or Firm*—Paul W. Garbo

[57] ABSTRACT

A simple apparatus for molding and baking food particles into edible unified products comprises a heated stationary ring sandwiched by a heated bottom plate and a heated top plate. Both plates can alternately be brought against, and removed from, the ring. By placing a measured quantity of food particles on the bottom plate while against the ring and by bringing the top plate down on the ring, the food particles are compressed for a selected baking period. The top plate is then raised from the ring and the bottom plate is lowered from the ring so that the resulting unified product is released.

12 Claims, 2 Drawing Sheets

METHOD AND APPARATUS FOR MOLDING FOOD PARTICLES

BACKGROUND OF THE INVENTION

This invention relates to an apparatus and method of molding food particles into edible coherent products. More particularly, the invention involves compressing and baking food particles to yield shaped products such as pie shells.

Illustrative of an edible product composed of pieces of food bonded together is the pasta-based product of U.S. Pat. No. 5,411,752 to Taylor et al. The patent discloses the formation of discrete pieces of cooked pasta with a binding composition into a desired shape. The pasta-based product is proposed as the base or shell of a pizza and as such may be garnished with tomato sauce, cheese, mushrooms, etc. U.S. Pat. No. 4,693,900 to Molinari also describes a shaped pasta product formed of cooked pasta. Zukerman discloses in U.S. Pat. Nos. 3,711,295; 3,961,087 and 5,137,745 shaped food products composed of rice and other cereal grains.

The prior art, however, fails to teach a simple apparatus and method for forming shaped products composed of food particles.

Accordingly, a principal object of the invention is to provide an apparatus and method for compacting and heating food particles into edible unified shapes.

Another important object is to provide an apparatus and method suitable for the commercial production of shaped products composed of coherent food particles.

A further object is to provide apparatus that can be automated with minimum mechanical movements.

These and other features and advantages of the invention will be apparent from the description which follows.

SUMMARY OF THE INVENTION

In accordance with this invention, an apparatus for molding and heating food particles into a unified shaped product comprises a heated stationary ring, a heated top plate that can be alternately brought down on, and lifted off, the ring, and a heated bottom plate that can be alternately brought up against, and down away from, the ring.

When the bottom plate is brought up against the bottom of the ring, a shallow pan or basin is in effect formed. A desired amount of food particles deposited on the bottom plate can be compressed and baked by bringing the top plate down on the ring. At the end of the baking period, the top plate is moved up away from the ring and the bottom plate is moved down away from the ring. The thus formed, coherent food product drops out of the ring as the bottom plate moves down away from the ring. The food product is easily pushed off the bottom plate onto a conveyor belt or removed from the bottom plate in any other desired manner such as manually.

The bottom plate is pushed up against the ring to provide the shallow pan into which another measured amount of food particles is dropped to start again the cycle of compressing and cooking the food particles into a unified edible disk.

The top or molding face of the bottom plate is preferably smooth and flat to facilitate the removal of the coherent food product formed thereon simply by pushing the product horizontally. Of course, the top face may have slight curvature and/or a slightly indented pattern that will not interfere with the removal of the shaped food product therefrom by a horizontal push.

The bottom or molding face of the top plate can be flat, concave or convex. A convex face, e.g., one with a protrusion having a periphery smaller than the inside periphery of the ring, will form a unified food product shaped like a shallow pan with a turned-up lip. A top plate with a concave molding face will yield a product shaped like a meringue pie. In short, the molding face of the top plate can have many contours.

While the inside periphery or wall of the ring of the apparatus of the invention is circular in its simplest embodiment, it may be oval, square, oblong or other desired shape, e.g., heart shape. That inner wall may be vertical, slanted or curved but the periphery at the bottom of the ring preferably should be slightly larger than the top periphery so that the molded food product can more easily drop out of the ring when the bottom plate is moved down from the ring.

While the heating of the top and bottom plates and ring can be achieved with steam or other heating fluid, or even with gas burners, electrical heaters are preferred for structural simplicity and ease of temperature control. While electrical heating elements can be attached to the exterior portions of the top and bottom plates and the ring, they are frequently embedded in the plates and ring. Aluminum is the preferred metal, but other metals such as stainless steel may be substitutes. When the top and bottom plates and the ring are formed of thick aluminum stock, it may be drilled to provide cavities into which electrical heating elements are fitted. Another way of embedding the heating elements is to mill grooves or cavities in the exterior portions of the plates and ring so that the heating elements can be laid therein. Regardless of how heating is effected, insulation should cover all exterior portions of both plates and ring to reduce heat losses and prevent burns to workers.

Of the many types of food particles that can be molded into coherent shaped products, the aforementioned U.S. patents specify some common examples. To begin with, the term "particle" as used herein is intended to embrace discrete matter ranging in size from about a grain of rice to a pasta shape such as ziti or spaghetti cut to a length preferably not exceeding about 3 inches. Chopped meat, fish, vegetables, etc., together with binding agents such as eggs and edible gums are additional examples. Some foods tend to stick to the molding faces. A Teflon coating on the molding faces is often adequate to overcome the problem. Chromium plating is another way of eliminating the stickiness of some foods to the molding faces.

Basically, the vertical movements of the top and bottom plates can be effected manually. However, the simplicity of the movements makes it obvious that various known mechanical means can be used to eliminate manual labor. For example, pneumatic pistons are simple and quick-acting means for achieving the required movements of both molding plates. Rack and pinion or a motor-driven screw can also produce the piston-like movements of both molding plates. Through the use of mechanical means actuated electrically, pneumatically, hydraulically or magnetically, the apparatus of the invention is easily automated by a timing device that causes the sequential movements of the top and bottom molding plates and even means for supplying a measured amount of food particles on the bottom plate as well as means for displacing the molded product therefrom. In short, the apparatus of the invention is ideally suitable for large-scale production of molded food products.

BRIEF DESCRIPTION OF THE DRAWINGS

For further clarification of the invention, the following description will refer to the appended drawings of which.

DESCRIPTION OF PREFERRED EMBODIMENTS

Figure 1:
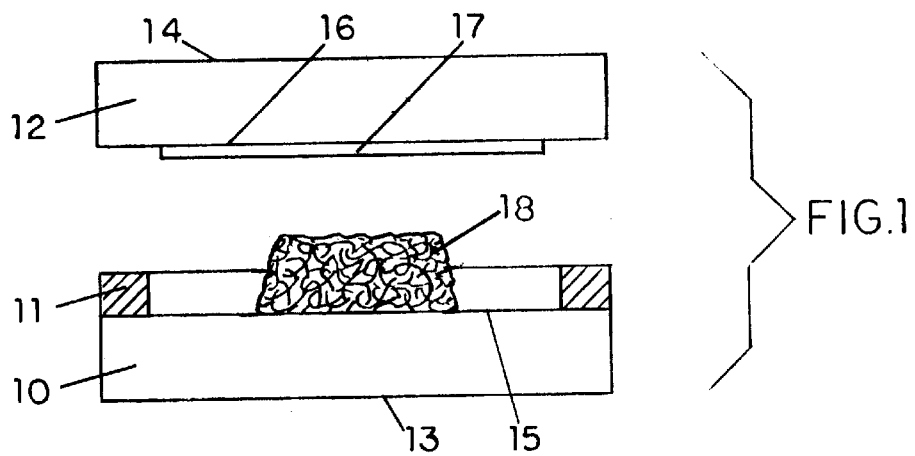
FIG. 1 is a diagrammatic elevation of a simple embodiment of the apparatus of the invention, shown with a measured quantity of food particles.

FIG. 1 shows the basic components of the apparatus of the invention, namely, bottom molding plate 10 positioned against ring 11 (shown in section) and top molding plate 12 positioned above ring 11 which is held in a fixed position by any rigid structure. Sides 13,14 of plates 10,12, respectively, are preferably connected to piston rods (not shown) which can move plates 10,12 up and down. While bottom plate 10 has a flat molding face 15, top plate 12 has a molding face 16 with flat protrusion 17 that extends into the molding space when top plate 10 is seated on ring 11. The periphery of protrusion 17 is smaller than the inside periphery of ring 11 so that the molded food product will have the form of a shallow pan or pie shell with a turned-up edge. As previously explained, both plates 10,12 and ring 11 are preferably electrically heated.

To simplify the description of the molding operation without reference to obvious mechanisms for moving plates 10,12 up and down, it will be assumed that movements are performed manually. With bottom plate 10 positioned against ring 11 as shown in FIG. 1 to provide a shallow basin and with top plate 12 raised well above ring 11, a measured amount of food particles 18 is dropped on bottom plate 10.

Figure 2:
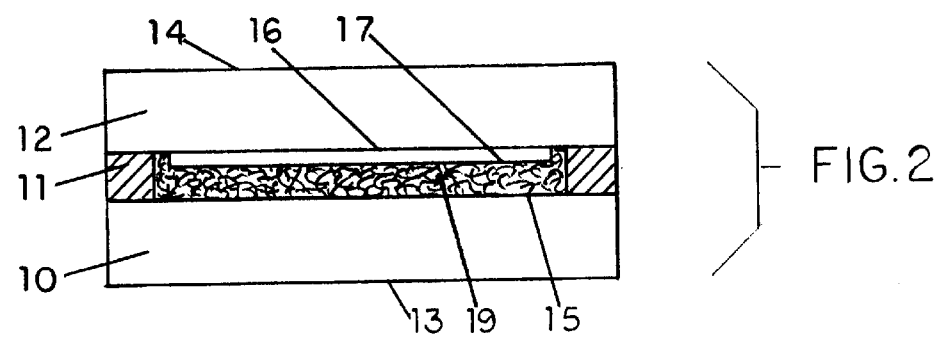
FIG. 2 is a similar view during the compression and baking period of the food particles.
Figure 3:
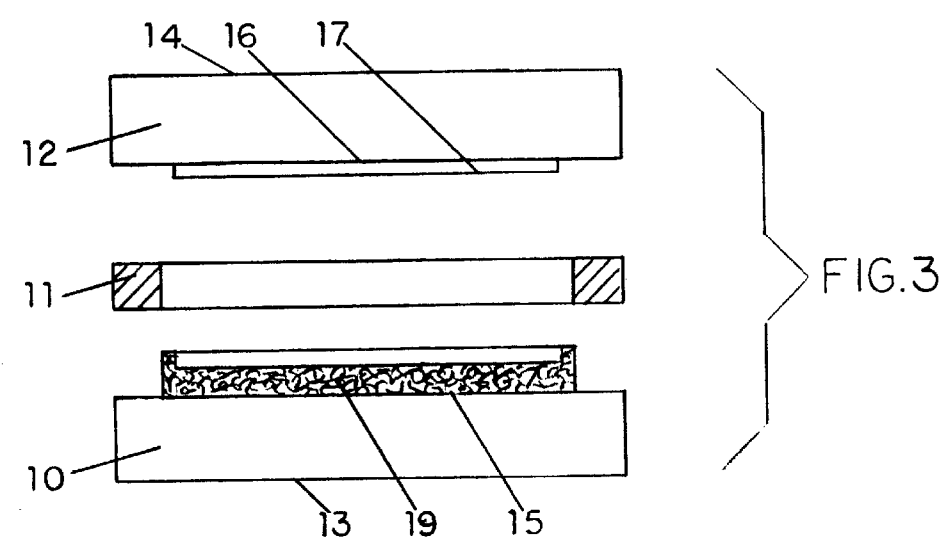
FIG. 3 is a similar view, after the baking period.

Thereupon, as shown in FIG. 2, top plate 12 is brought down on ring 11 and pressed thereagainst, thereby compressing the food particles into all of the molding space to form shaped product 19. At the end of the baking period, as shown in FIG. 3, top plate 12 is raised well above ring 10, and bottom plate 10 is pulled down away from ring 11 with the molded food product 19 resting on plate 10. Molded food product 19 is easily pushed off plate 10 onto an adjacent conveyor belt or otherwise removed from plate 10.

Having completed the formation and discharge of a molded food product, the apparatus is ready to repeat the operation. Bottom plate 10 is pushed up against ring 11 to form the cavity or basin into which a measured quantity of food particles 18 is again deposited (FIG. 1) and top plate 12 is brought down on ring 11 (FIG. 2), thus starting the formation of another unit of molded food product.

Food particles containing moisture and other volatile components will generate a gas pressure within the mold formed by plates 10,12 and ring 11. Especially, during the start of the baking period, the pressure on top plate 12 to keep a tight seal where plate 12 is seated on ring 11 should be diminished for a few seconds to allow the volatiles to leak out. Food particles with a high content of volatiles may require several such brief ventings of volatiles to prevent the build-up of excessive gas pressure within the mold.

Lifting top plate 12 well above ring 11 is desirable to provide space for means to move toward the center of bottom plate 10 and drop a measured amount of food particles thereon for the molding of the shaped product. For example, a cup mounted on the end of a piston rod could move into the zone between top plate 12 and ring 11, and after delivering the food particles on plate 10, retract from that zone so that top plate 12 can be brought down on ring 11 without any obstruction by the delivery means for the food particles.

Figures 4A, 4B, 4C, 4D:
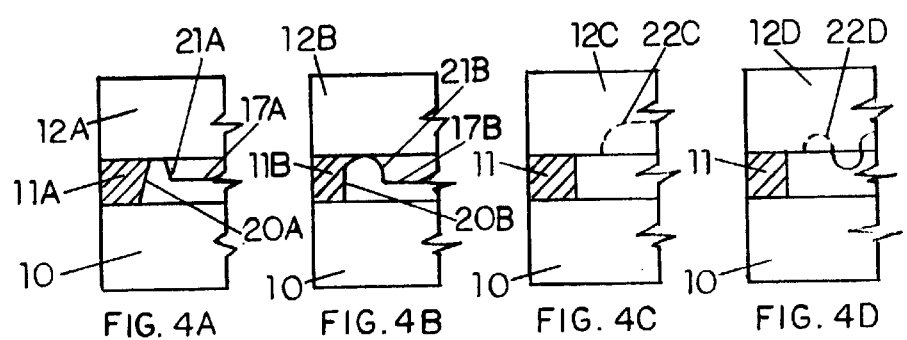
FIGS. 4A, 4B, 4C and 4D are partial elevations like FIG. 2, showing different contours of the top plate and ring of the apparatus of the invention.

FIG. 4A shows a section of ring 11A with inner face 20A slanted so that the bottom inside periphery of ring 11A is slightly larger than its top inside periphery. Also, top plate 12A has protrusion 17A with a rounded periphery 21A rather than the angular periphery shown with protrusion 17 of FIG. 1.

FIG. 4B shows a section of ring 11B with inner face 20B curved to provide a larger bottom inside periphery than its top inside periphery. Top plate 12B has protrusion 17B with an inwardly rounded periphery 21B.

FIG. 4C shows a section of ring 11 with bottom plate 10 of FIG. 2 combined with top plate 12C, the molding face 22C of which is concave.

FIG. 4D shows a section of ring 11 with bottom plate 10 of FIG. 2 combined with top plate 12D, the molding face 22D of which is corrugated so that the molded food product will have an attractive top surface.

Figure 5:
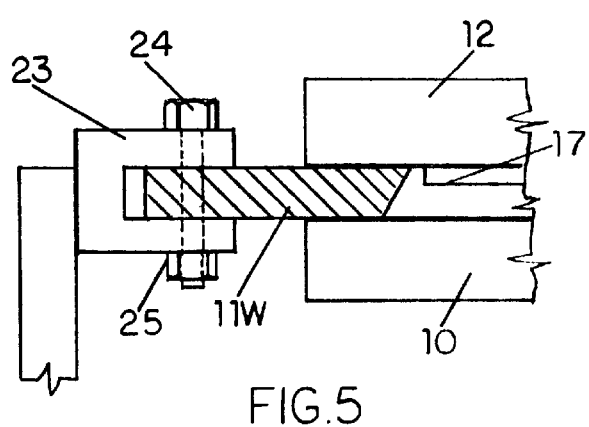
FIG. 5 is a partial elevation like FIG. 2, showing a ring that is horizontally larger than the top and bottom plates.

FIG. 5 shows a partial elevation of top plate 12 and bottom plate 10 of FIG. 2 with a section of wide ring 11W sandwiched in between. The outer portion of ring 11W that extends beyond the peripheries of plates 10,12 is shown captured in slotted clamp 23. Bolt 24 passes through both clamp 23 and ring 11W, and nut 25 serves to prevent any movement of ring 11W in clamp 23 which is part of a support structure (not shown). Of course, there will be several clamps 23 spaced around ring 11W. Other ways of anchoring ring 11W in a fixed position will be obvious to any mechanic.

Figure 6:
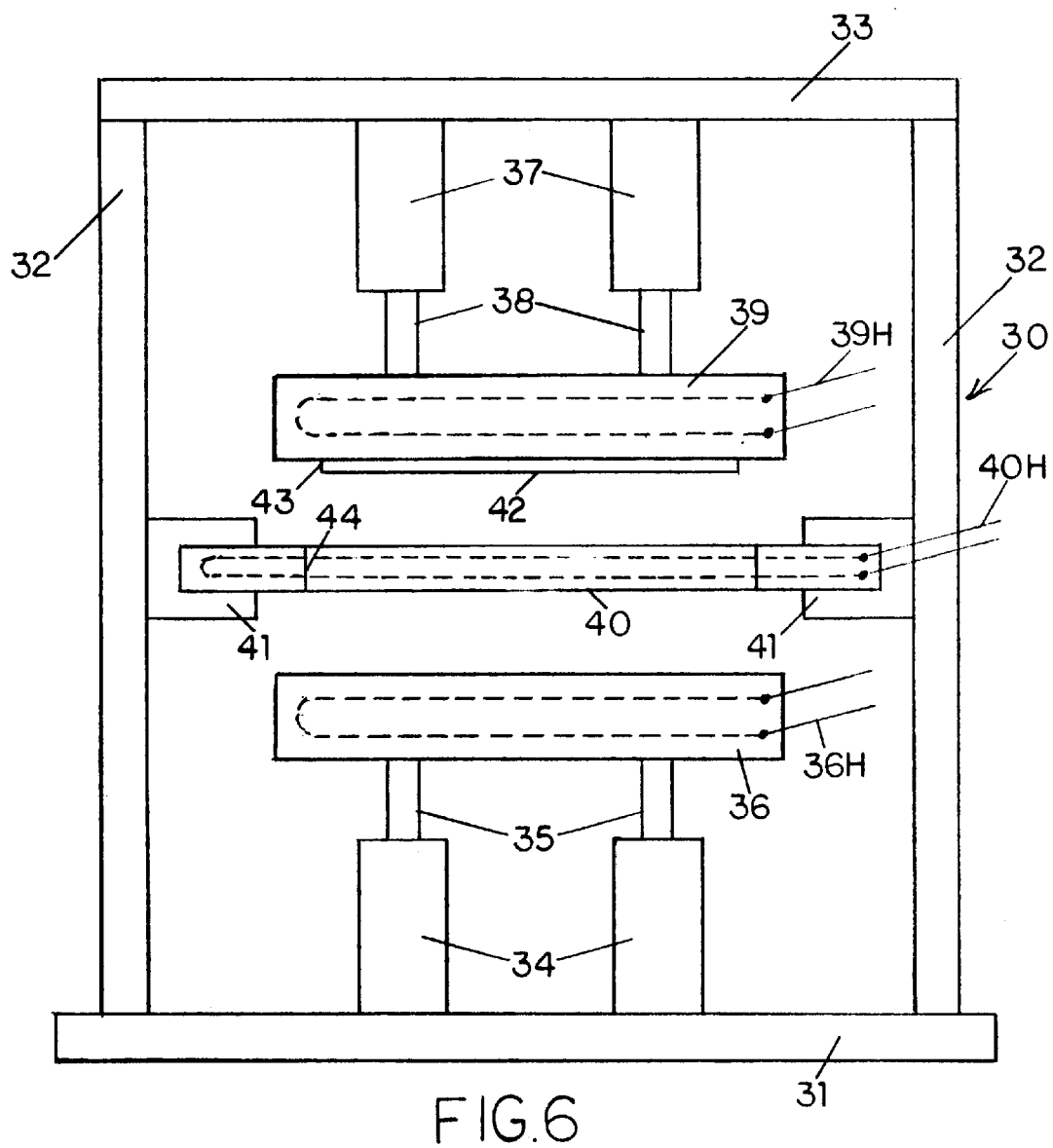
FIG. 6 is a diagrammatic elevation of a rigid structure for supporting and mechanically moving parts of the apparatus of the invention.

FIG. 6 shows a rigid steel frame 30 with base 31, uprights 32 and top 33. A pair of pneumatic cylinders 34 attached to base 31 have their piston rods 35 connected to bottom plate 36. A pair of pneumatic cylinders 37 attached to top 33 have their piston rods 38 connected to top plate 39. Ring 40 is held by clamps 41 which are fastened to uprights 32. Each of members 36,39,40 has an embedded electrical heater 36H,39H,40H, respectively. As more clearly shown in FIG. 2, protrusion 42 on the molding face of top plate 39 has a periphery 43 that is slightly smaller than the periphery of inner wall 44 of ring 40.

By activating cylinder 34, bottom plate 36 is pushed up against ring 40. After depositing a measured quantity of food particles on bottom plate 36, cylinders 37 are activated to push top plate 39 down against ring 40, thus compressing the food particles on bottom plate 36. After a selected baking period, cylinders 37 serve to lift top plate 39 and cylinders 34 pull bottom plate 36 down with the unified food product thereon. The food product can be mechanically pushed off bottom plate 36 onto an adjacent conveyor or manually removed. Thereupon, bottom plate 36 can again be pushed up by cylinders 34 against ring 40 to start the cycle of movements for forming another unit of unified food product.

Many variations and modifications of the invention will be apparent to those skilled in the art without departing from the spirit or scope of the invention. For example, either or both of plates 10,12 may have a molding face formed of one metal backed up by a different metal. Also, the molding face of top plate 12 may be partly concave and partly convex. For example, if the border portion is concave and the core portion is convex, the molded food product will, in its upper portion, be doughnut-like in shape. Accordingly, only such limitations should be imposed on the invention as are set forth in the appended claims.

What is claimed is:

1. An apparatus for molding and heating food particles into a unified, edible product, which comprises a heated fixed ring sandwiched between a heated top plate that can alternately be raised from, and lowered against, said ring, and a heated bottom plate that can alternately be lowered from, and raised against, said ring.

2. The apparatus of claim 1 wherein the top plate, the bottom plate and the ring are made of aluminum and each of which has electrical heating elements attached thereto.

3. The apparatus of claim 2 wherein the molding face of the top plate is partially convex.

4. The apparatus of claim 2 wherein the molding face of the top plate is partially concave.

5. The apparatus of claim 2 wherein the top plate and the bottom plate are individually attached to pneumatic piston rods that effect the reciprocation thereof.

6. The apparatus of claim 5 wherein the pneumatic piston rods are sequentially activated by a timing device.

7. The apparatus of claim 2 wherein the ring has a circular inner wall, and the top plate has a circular protrusion with a diameter slightly smaller than the diameter of said inner wall so as to form a unified product shaped like a pizza shell with a turned-up rim.

8. A method of molding and baking food particles into a shaped edible product, which comprises the sequential steps of depositing a measured quantity of said food particles on a heated bottom plate while the top face thereof is against a heated fixed ring, bringing a heated top plate down against said ring, raising said top plate away from said ring after a selected baking period, moving said bottom plate down from said ring and removing the resulting shaped edible product.

9. The method of claim 8 wherein the ring has a circular inner wall, the food particles are pieces of cooked pasta admixed with an edible binding agent and the bottom face of the top plate has a circular protrusion with a diameter slightly less than the diameter of said circular inner wall so as to form a shaped product similar to a pizza shell with a raised edge.

10. The method of claim 8 wherein the ring has a circular inner wall, the food particles are pieces of cooked pasta admixed with ground meat, and the bottom face of the top plate is concave so as to form a shaped product similar to a hamburger.

11. The method of claim 8 wherein the food particles are processed, sticky rice admixed with ground meat, and the bottom face of the top plate is concave.

12. The method of claim 9 wherein the pieces of cooked pasta have a length not exceeding about 3 inches.

* * * * *